United States Patent
Grupp et al.

(10) Patent No.: US 7,792,653 B2
(45) Date of Patent: Sep. 7, 2010

(54) CORRECTION OF INTERPOLATION ERRORS OF A MACHINE, SUCH AS A COORDINATE MEASURING MACHINE

(75) Inventors: Guenter Grupp, Boehmenkirch (DE); Berndt Kammleiter, Oberkochen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 124 days.

(21) Appl. No.: 12/020,135

(22) Filed: Jan. 25, 2008

(65) Prior Publication Data

US 2008/0177491 A1   Jul. 24, 2008

Related U.S. Application Data

(63) Continuation of application No. PCT/EP2006/006645, filed on Jul. 7, 2006.

(30) Foreign Application Priority Data

Jul. 28, 2005   (DE) ................. 10 2005 036 719

(51) Int. Cl.
*G01C 17/38* (2006.01)
(52) U.S. Cl. ....................................... 702/94
(58) Field of Classification Search .................. 702/94, 702/95, 150, 182–185, 17, 190, 191, 195; 73/1.79; 700/302
See application file for complete search history.

(56) References Cited

U.S. PATENT DOCUMENTS

| 3,555,254 A | 1/1971 | Gerber ..................... 318/632 |
| 4,225,931 A | 9/1980 | Schwefel .................. 702/150 |
| 4,612,709 A | 9/1986 | Baisch et al. ................. 33/707 |
| 5,305,241 A | 4/1994 | Hayashi et al. ............... 702/94 |
| 2005/0102118 A1* | 5/2005 | Grupp et al. ................. 702/150 |
| 2006/0052973 A1* | 3/2006 | Hiller ........................ 702/150 |
| 2008/0154527 A1* | 6/2008 | Staaden et al. ................ 702/95 |
| 2009/0259918 A1* | 10/2009 | Sugie et al. ................. 714/764 |

FOREIGN PATENT DOCUMENTS

| DE | 1 638 032 | 12/1971 |
| DE | 27 29 697 | 1/1979 |
| DE | 33 02 063 A1 | 7/1984 |
| DE | 34 13 855 A1 | 10/1985 |
| DE | 34 26 863 A1 | 1/1986 |
| DE | 44 43 898 A1 | 6/1996 |
| EP | 0 048 851 | 4/1982 |

OTHER PUBLICATIONS

English Translation of EP 048851, Apr. 7, 1982.*

* cited by examiner

*Primary Examiner*—Michael P Nghiem
(74) *Attorney, Agent, or Firm*—Harness, Dickey & Pierce, P.L.C.

(57) ABSTRACT

A machine, such as a coordinate measuring machine, uses a material measure with a periodic division in order to determine spatial positions of a working or measuring head. The periodic division of the material measure is further subdivided by interpolation values. For the purpose of correcting interpolation errors, the head is moved to a plurality of positions and a plurality of position data is determined. The plurality of position data represents a position curve of the head. A periodic component in the position curve is determined, which periodic component corresponds approximately to the periodic division of the material measure. Correction values are determined and the interpolation values are corrected using the correction values such that the periodic component is substantially reduced or largely eliminated.

12 Claims, 4 Drawing Sheets

CORRECTION OF INTERPOLATION ERRORS OF A MACHINE, SUCH AS A COORDINATE MEASURING MACHINE

CROSS-REFERENCES TO RELATED APPLICATIONS

This application is a continuation of international patent application PCT/EP2006/006645, filed on Jul. 7, 2006 designating the U.S., which international patent application has been published in German language and claims priority from German patent application DE 10 2005 036 719.4, filed on Jul. 28, 2005. The entire contents of these priority applications are incorporated herein by reference.

BACKGROUND OF THE INVENTION

The present invention relates to a method for correcting interpolation errors of a machine, such as but not limited to a coordinate measuring machine, and to a corresponding machine.

Coordinate measuring machines are typically used for determining individual spatial coordinates and/or the object shape of a test object by means of measuring technology, e.g. for quality control during the manufacture of workpieces. The known coordinate measuring machines comprise what is called a probe which is arranged on a displacement frame and can be moved in at least one spatial direction. There is often a stylus at the probe, which stylus is used to touch a selected measurement point on the test object. The spatial coordinates of the measurement point can then be determined from the position of the probe, wherein the deflections of the stylus upon touching are often also taken into consideration. Alternatively, there are also coordinate measuring machines which capture a measurement point on the test object without contact, e.g. using optical means.

In order to determine the position of the head in the measurement volume, coordinate measuring machines comprise material measures for the individual axes of travel. These material measures are often glass scales on which periodic divisions in the form of e.g. marking lines are applied. The periodic division is sampled by means of a sensor as the probe moves. The accuracy of the material measure therefore determines the measuring accuracy of the coordinate measuring machine.

In addition to glass scales, there also exist other material measures comprising a periodic division, e.g. material measures which are inductively sampled. Irrespective of the type of the material measure, each measurement of a coordinate measuring machine is prone to measuring errors which can have various causes. The causes include manufacturing tolerances and non-linearities in the guideways, deformations resulting from thermal influences and/or under load, manufacturing tolerances in the material measures and others. In order to reduce the effect of such measurement errors, it is known that the measured positional values which the coordinate measuring machine receives from its position measurement devices can be corrected mathematically. For this purpose, correction values are usually stored in the control and evaluation unit of the coordinate measuring machine, wherein the correction values themselves are determined from a reference measurement which is carried out using a laser interferometer, for example. Such a method is described in DE 1 638 032 A1, for example. This document also discloses performing an error correction by means of interpolation values, said interpolation values being determined from the interpolation of adjacent reference points.

Furthermore, interpolation values are often used in the case of coordinate measuring machines in order to mathematically increase the resolution and thus the measuring accuracy of the coordinate measuring machine. For example, DE 27 29 697 A1 describes a method for interpolating path-dependent and angle-dependent periodic signals of a photoelectric digital length-measurement or angle-measurement system. A general problem is here that the measuring accuracy ultimately depends on the quality of the interpolation values. Errors in the position signals which have been captured using measuring technology also adversely affect the interpolation values. DE 27 29 697 A1 therefore proposes that the measured values which are used for the interpolation be corrected before the interpolation algorithm is applied. These are typically digital values which are generated from the analog measurement signals of the material measure using A/D converters. It is proposed that the digital values be corrected in respect of symmetry, amplitude equality and 90° phase offset in order to eliminate corresponding fluctuations in the analog measurement signals.

A similar method is disclosed by DE 34 13 855 A1. This document also proposes the use of a signal curve which has been corrected in terms of amplitude, bias voltage and phase position as a basis for the interpolation calculation.

EP 0 048 851 B1 discloses the correction of interpolation values by means of correction values that were obtained from a reference measurement carried out using a laser interferometer. According to this, the interpolation values are calibrated in exactly the same way as the non-interpolated positional measured values of the coordinate measuring machine.

Furthermore, DE 34 26 863 A1 discloses the use of a rotatory (indirect) measurement system in addition to a linear material measure (designated therein as a direct measurement system), wherein the measurement resolution of the rotatory measurement system is approximately ten times higher than the measurement resolution of the linear position-measurement system. "Interpolation values" are thus obtained, i.e. by means of a second measurement system.

From DE 33 02 063 A1 it is known to superimpose correction values, which were determined for all possible positions, thermal states and load conditions, onto the measured actual values in a coordinate measuring machine, before the measured actual values are processed further. In order to avoid intervention in the control loop of the machine, the superimposition of the calculated correction values takes place in such a way that a corrected position value is simulated to the position control loop of the coordinate measuring machine. This is said to prevent a change in the stability characteristics.

A common feature of all known methods is that special hardware components are required for calculating and correcting the interpolation values, which is disadvantageous in terms of the manufacturing costs of the corresponding coordinate measuring machine.

SUMMARY OF THE INVENTION

Against this background, it is an object of the present invention to provide a method for correcting interpolation errors in machines having a periodically divided material measure, such as coordinate measuring machines, in a simple and inexpensive manner. It is a further object to provide a corresponding machine.

According to one aspect of the invention, there is provided a method for correcting interpolation errors of a machine having a mobile head and a position measurement device for determining movement positions of the head, wherein the position measurement device includes a material measure with a periodic division, and wherein interpolation values which further subdivide the periodic division are used for determining the movement positions, the method comprising the steps of moving the head to a plurality of positions, determining a plurality of position data corresponding to the positions of the head by means of the position measurement device, wherein the plurality of position data represents a position curve, determining a periodic component in the position curve, said periodic component having a period which corresponds approximately to the periodic division of the material measure, and determining correction values for correcting the interpolation values such that the periodic component is at least reduced.

According to another aspect, there is provided a machine comprising a mobile head, comprising a position measurement device for determining movement positions of the head, the position measurement device having a material measure with a periodic division, comprising a processor for determining interpolation values which further subdivide the periodic division, and comprising a unit for determining correction values for correcting the interpolation values, wherein the unit comprises a first part designed for recording a position curve having a plurality of position data which corresponds to the changing positions of the head, wherein the unit further comprises a second part designed for determining a periodic component in the position curve, the periodic component having a period which corresponds approximately to the periodic division of the material measure, and wherein the unit comprises a third part designed for determining the correction values such that the periodic component is at least reduced.

The novel method and the novel machine are derived from the insight that, when the head moves, the position curve features a periodic component whose period corresponds approximately to the period of the material measure. This component is not explained by the actual travel of the head. This periodic component is found in what is called the drag distance, for example. The drag distance is the positional deviation between the set position and the actual position when the head moves. It is normally used by the position controller for controlling the travel movements of the head.

In principle, a periodic component in the position curve of the head could indicate o in the travel movements of the head. However, the periodic component is also present if corresponding fluctuations can be excluded on the basis of the boundary conditions when the head is moved. In addition, the correspondence of the periodic component with the period of the division of the material measure is surprising. This therefore suggests the conclusion that the periodic component in the measured position curve is not actually present at all, but instead only appears as a result of interpolation errors between the division lines of the material measure. With this insight as a starting point, experiments were conducted in order to determine correction values for correcting the interpolation values on the basis that the periodic component in the position curve of the head is eliminated, at least to a significant extent. These experiments showed that the measuring accuracy of the coordinate measuring machine can actually be increased.

Although the analysis of the drag distance represents a preferred exemplary embodiment, the invention is not restricted to this. In fact, the periodic component is also apparent if the "actual positions" of the head as supplied by the material measure are used as a basis. It is therefore also possible to analyze the position curve directly.

The novel method has the advantage that no further measurement system, such as a laser interferometer or an inductive sampler, is required for correcting the interpolation values. The correction values can be determined by means of simply moving the head.

Furthermore, the novel machine and the novel method do not require an A/D converter for converting the analog sensor signals. Consequently, the novel method can also be applied in the case of coordinate measuring machines which use touch-trigger probes. Moreover, the novel method is also suitable for digital measurement systems, and interpolation errors are corrected irrespective of their cause. For example, the novel method also corrects interpolation errors which are not due to amplitude position, phase position and/or offset of the analog measurement signals.

Finally, the novel method has the advantage that the error curve for correcting the interpolation values can also be automatically determined and continuously adapted in live measuring mode. It is therefore possible to perform and continuously repeat the determining of the correction values "online" while the coordinate measuring machine is being utilized. Changes in the operating process, e.g. a deformation of the material measure under load, are therefore taken into consideration in real time.

As a result of dispensing with additional measurement systems and/or A/D converters, implementation of the novel method is very inexpensive.

In a preferred refinement of the invention, the position curve is filtered in order to determine the periodic component. In this case, the head of the machine is preferably moved slowly and continuously.

For the purpose of filtering, it is possible to use a high-pass filter or a band-pass filter which is tuned to let through frequencies which correspond to the periodic division of the material measure. Both analog and digital filters can be used here. A digital filter can be realized very easily by means of a software algorithm which is executed on the already existing processor of the evaluation and control unit. This refinement determines the interpolation errors directly from the position curve and is therefore particularly preferred in the case of coordinate measuring machines which do not supply a drag distance signal.

In a further preferred refinement, a drag signal (preferably the drag distance for the position controller) is generated when the head moves, wherein said drag signal represents a difference between a set position and an actual position of the head, and the periodic component is determined on the basis of the drag signal.

A drag signal and in particular the drag distance are particularly suitable for the novel method since the global position change is already eliminated and therefore the periodic signal component stands out relatively clearly. As a result, it is particularly easy to determine. Furthermore, the drag distance is often already available as a signal. Consequently, realization of this refinement is particularly simple and inexpensive.

In a further refinement, the correction values are stored in a sequential correction value table, with each interpolation value being assigned exactly one table cell in the sequential correction value table.

A sequential correction value table is particularly well suited for the realization of the novel method because the ordering of the table can very easily be adapted to the positions of the head. The correction values for a specific head position can then be retrieved very quickly.

In a further refinement, each interpolation value is assigned that table cell which is derived from the position data of the head using a modulo N operation, with N being the number of correction values in the sequential correction value table.

This refinement allows a particularly rapid access to the correction values in the table. Furthermore, this refinement makes use of the periodicity of the error curve. It is sufficient to determine the correction values for an error period and store them in the sequential table. The access to the respective correct correction value is very easily and rapidly possible using the modulo N operation.

In a further refinement of the invention, the correction values in the correction value table are iteratively determined. In this case, it is particularly preferable if the correction values are determined using a digital filtering, for which e.g. the following relationship can be used:

$$K_i = K_{i-1} + F \cdot (K_i - K_{i-1}).$$

In this case, $K_i$ designates the correction value in the i-th iteration step, $K_{i-1}$ designates the preceding iteration step and F designates a weighting factor where $0 < F < 1$.

As explained below in the description of preferred embodiments, this refinement allows a particularly simple determination of the correction values. At the same time, this refinement represents a modest load on the performance of the processor in use.

In a further refinement, the correction values of the correction value table are determined in random chronological sequence and specifically until such time as a defined number of correction values have been determined.

This refinement represents a particularly simple implementation of the invention and is particularly advantageous in the case of modern coordinate measuring machines which approach a plurality of positions within an extremely short time. Moreover, this refinement is particularly suitable if the determining of the correction values is to take place online in the measuring mode.

In a further refinement, two correction value tables are provided, wherein a first correction value table is used for determining the correction values while a second correction value table is used for correcting the interpolation values, and wherein the correction values are transferred from the first correction value table into the table cells of the second correction value table.

This refinement is also particularly advantageous if the determining of the correction values is to take place online in the measuring mode of the coordinate measuring machine. As a result of using two correction value tables, it is possible to carry out the measurement without this being influenced by the determination of the correction values. In addition, the travel movements of the head in the measuring mode can be used very effectively for determining correction values in accordance with the present invention.

In a further refinement, the correction values are determined with reference to a defined periodic correction value curve which is adapted to the periodic component in respect of phase position, amplitude and offset. In a particularly preferred embodiment, a sinusoidal curve is used as a periodic correction value curve. In other preferred embodiments, however, it is also possible to use periodic functions having a greater degree of freedom.

This refinement assumes that it is known in advance that the curve of the correction values must be periodic in order to reduce the periodic component in the position curve of the head. The present invention therefore has as its starting point a periodic correction value curve which need only be adapted to the actual periodic component in terms of its parameters. The adaptation can take place according to the least squares method, for example, but also according to a different adaptation algorithm. The refinement is particularly advantageous if many correction values must be determined, since in this case the time for determining the correction values is largely independent of the number of correction values to be determined.

It is understood that the features cited above and those further explained below are applicable not only in the respectively specified combinations, but also in other combinations or on their own, without departing from the scope of the present invention.

BRIEF DESCRIPTION OF THE DRAWINGS

Exemplary embodiments of the invention are illustrated in the drawing and will be explained in further detail in the following description, wherein.

DESCRIPTION OF PREFERRED EMBODIMENTS

Figure 1:
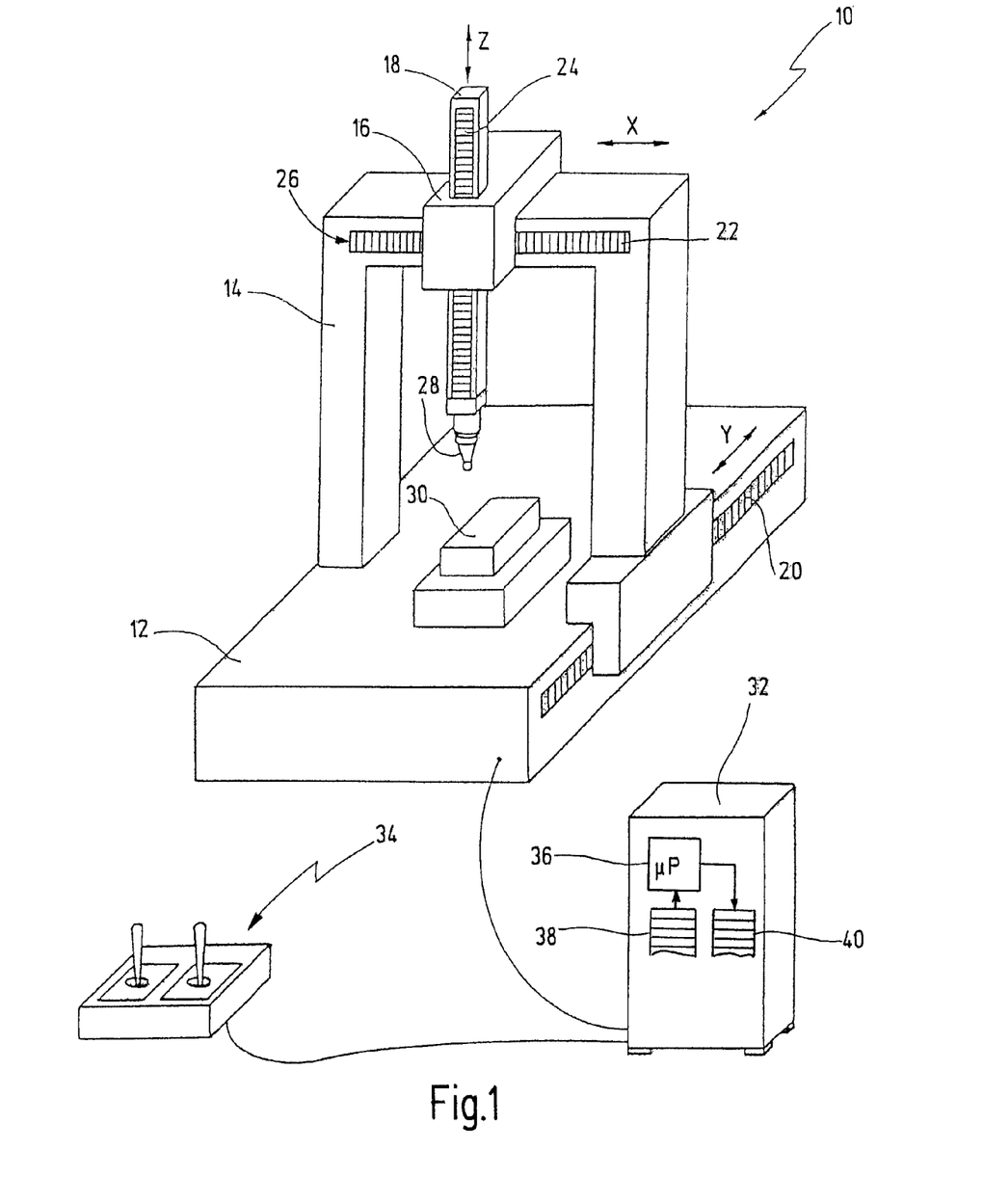
FIG. 1 shows a schematic illustration of an exemplary embodiment of the novel coordinate measuring machine.

In FIG. 1, reference numeral 10 designates in total a coordinate measuring machine as an exemplary embodiment of the novel machine. The coordinate measuring machine 10 is illustrated w a portal structure here. However, the invention is not restricted to this and can also be used in the case of coordinate measuring machines having a different kinematic structure, e.g. in the case of horizontal arm measuring machines. Moreover, the invention is not limited to coordinate measuring machines. It can also be utilized in the case of machine tools and other machines.

The coordinate measuring machine 10 has a base 12 upon which a portal 14 is arranged in a longitudinally displaceable manner. The displacement direction of the portal 14 is usually designated as the Y axis. On the upper crossbeam of the portal 14 is a carriage 16 which can be displaced in the X direction. On the carriage 16 is a quill 18 which can be displaced in the Z direction. Reference numerals 20, 22, 24 designate scales each comprising a periodic division 26. The scales 20, 22, 24 may be glass scales, for example, which are scanned using an optical sensor that supplies two sinusoidal signals phase-shifted by 90°. Such scales and sensors are frequently used for coordinate measuring machines. The invention is not restricted to this, however, and can also be applied in the case of other material measures having periodic division.

Reference numeral 28 designates a head arranged at the lower free end of quill 18. A test object 30 is approached by means of the head, and the spatial coordinates of the measurement point can be determined from the position of the head 28 in the measurement volume.

Reference numeral 32 designates an evaluation and control unit which controls the travel movements of the head 28 and also calculates the spatial coordinates of the measurement point. It also analyzes the signals of the sensors which sample the scales 20, 22, 24.

The control of the head 28 can also take place manually in the case of this coordinate measuring machine 10, namely via an operator control desk 34 which is connected to the control and evaluation unit 32. The control and evaluation unit 32 includes a processor 36, and at least a first memory 38 and a second memory 40. Correction values in a sequential table are stored in the memory 38. The processor 36 utilizes the correction values from the memory 38 in order to determine the spatial coordinates of the measurement point. In this case, the correction values from the memory 38 are used for correcting interpolation values which the processor 36 determines from the signals of the position sensors in a manner known per se.

The table which is stored in memory 40 is utilized in accordance with a preferred exemplary embodiment of the invention for re-determining the correction values online during the measuring mode.

Figure 2:
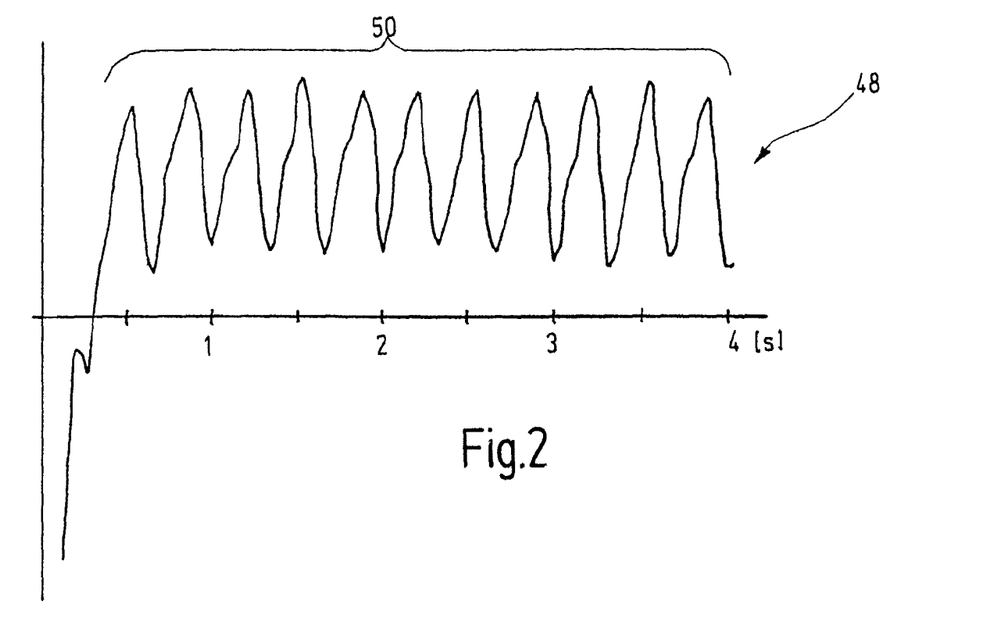
FIG. 2 shows a curve of the drag distance in the case of the coordinate measuring machine from FIG. 1 if the interpolation values are not corrected in the manner according to the invention.

FIG. 2 illustrates a signal curve 48 which represents the curve of the drag distance that is produced when the head 28 is moved along a coordinate axis without the interpolation errors being corrected in the inventive manner. Instead of the drag distance, which is supplied to the position controller (not shown here) for the control of the head 28, it is also possible to use another signal which represents the drag distance. Furthermore, the invention can also be realized by directly analyzing the position curve of the head 28.

As can be seen from FIG. 2, the drag distance 48 comprises a periodic signal component 50. The signal component 50 has a period which corresponds approximately to the periodic division 26 of the associated scale.

Figure 3:
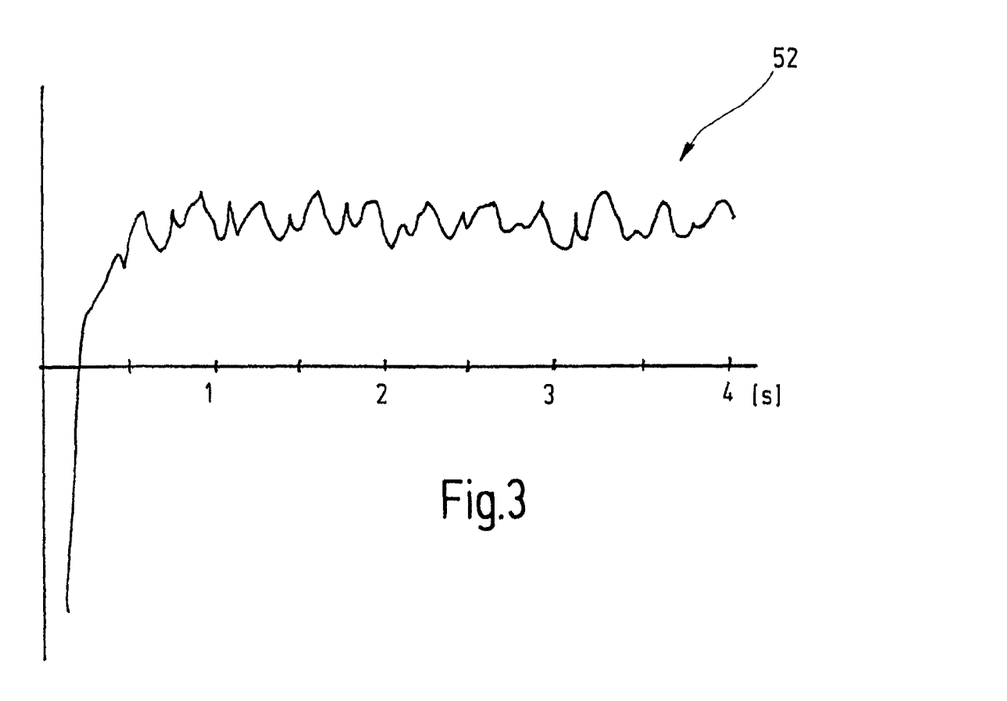
FIG. 3 shows the curve of the drag distance if the interpolation values are corrected in the manner according to the invention.

FIG. 3 shows the signal curve according to FIG. 2, wherein the inventive method for correction of interpolation errors has been used in this case. It can be seen that the periodic component has been largely eliminated. The drag distance 52 has only small statistical fluctuations which can be attributed to noises, wow and flutter and other statistical effects.

Figure 4:
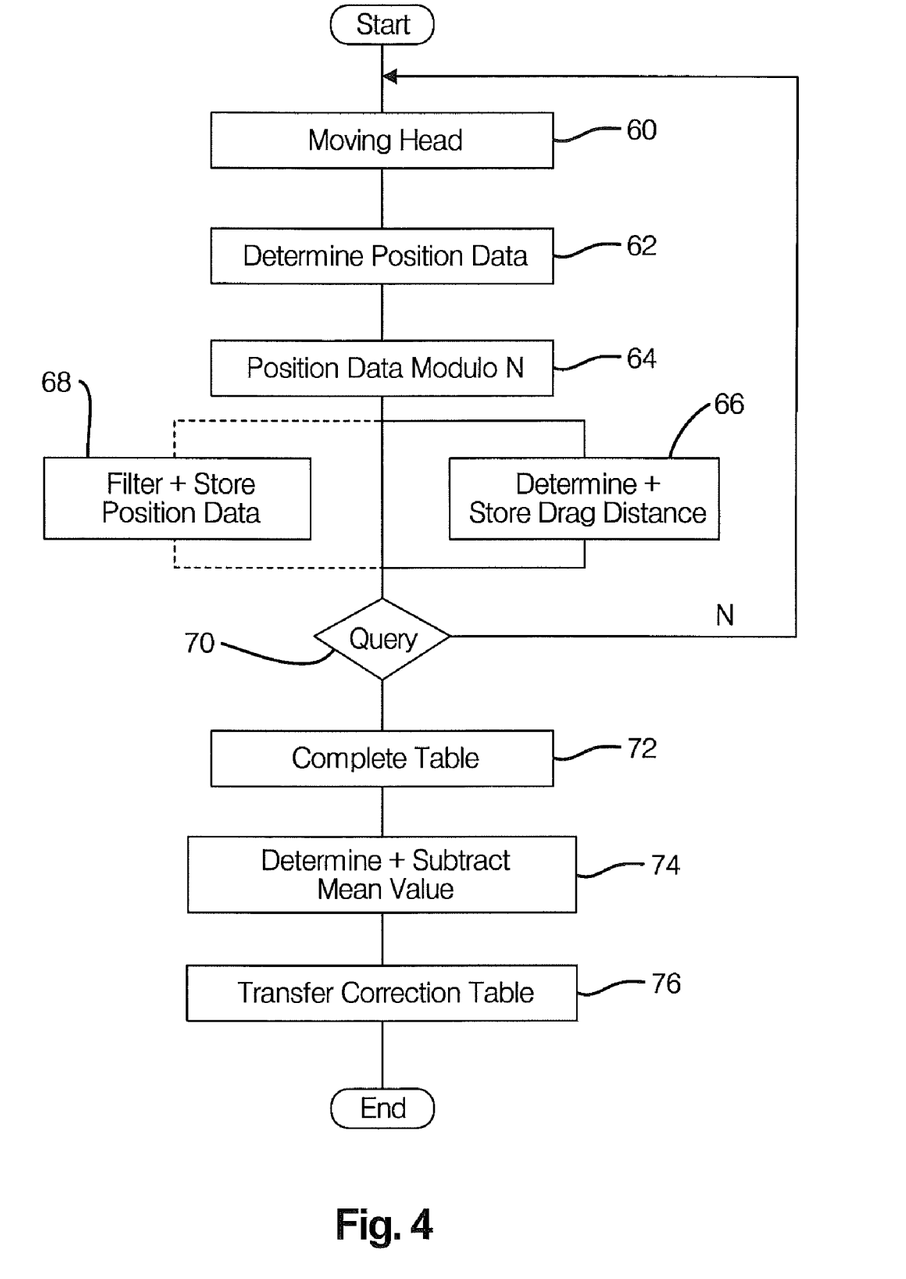
FIG. 4 shows a simplified flow diagram for explaining a first exemplary embodiment of the novel method.

FIG. 4 shows a first exemplary embodiment of the novel method with reference to a simplified flow diagram. According to step 60, the head is moved to a spatial position. The position data relating to this spatial position is then determined by means of the scales 20, 22, 24 and the associated sensors. In step 64, the received position data is subjected to a modulo N operation. In this case, N designates the number of correction values and therefore the number of interpolation values with which a period of the periodic division is further subdivided. In the case of a scale having a lattice or line spacing of 16 µm, it might be appropriate to calculate e.g. 160 interpolation values. Accordingly, 160 correction values are required and these are stored in a sequential table having 160 table fields. The measurement system therefore has a resolution of 0.1 µm and a correction value is available for each 0.1 µm step.

In the case of a coordinate measuring machine having the above scale, the received position data is therefore subjected to a modulo 160 operation. If the position of the head in a coordinate measuring machine is e.g. 80.0042 mm (=800, 042×0.1 µm), the mathematical operation 800042 modulo 160=42. The modulo operation therefore points to the table cell 42, where the correction value for the corresponding head position is located.

According to step 66, the drag distance is now determined for the time point at which the head 28 is situated at the cited position. This drag distance is stored at the table position which was determined in step 64 by means of the modulo operator, i.e. at the table position 42 in the present example.

Alternatively, instead of the drag distance, it is also possible to use the global position curve in order to fill the table cells in the correction value table in the memory of the coordinate measuring machine 10. For this, however, it is necessary to filter the position curve using a high-pass filter or a band-pass filter which is tuned to pass periodic signals having a period which corresponds to the periodic division of the material measures 20, 22, 24. Finally, the filtered position value is stored in the table cell which is determined in step 64.

In principle, it is also possible to execute both the steps 66 and 68 in order to balance the received correction values, for example. However, analysis of solely the drag distance is preferred from the present point of view.

In accordance with step 70, a query ascertains whether all table cells (or a defined number of table cells) are already occupied with correction values. If this is not the case, the method returns to the step 60 and a new table value is read in according to the described manner.

In the event that the modulo operation in the step 64 produces a table cell which is already occupied by a drag distance value and/or position value, the new table value is preferably calculated according to the following formula:

$$K_i = K_{i-1} + F \cdot (K_f - K_{i-1}).$$

In this case, $K_i$ designates the correction value or table value in the i-th iteration step and $K_{i-1}$ designates the correction value or table value in the preceding iteration step. F designates a weighting factor which can lie between 0 and 1. When the table values are updated thus, statistical fluctuations in the drag distance or in the position data are eliminated.

If the iteration loops are terminated in step 70 before all table positions in the table are occupied by drag distance data or position data, the table can be completed by inserting interpolated table values in accordance with step 72. Alternatively, however, it is also possible to continue the method until all table cells are occupied using "measuring technology".

In step 74, a mean value of all table values is determined. Said mean value is then subtracted from all table values. In this way, an offset in the table values is eliminated and a periodic correction signal remains, wherein each table value represents a correction value.

If these correction values are selected for each head position—again using the modulo N operation—and subtracted from the initially determined position data, the periodic component in the position curve is eliminated. The accuracy of the positional measured values is increased thereby.

In the case of the method according to FIG. 4, the correction value table can be "empty" at the outset. The steps 60 to 70 are then executed iteratively until the correction value table is sufficiently filled. As an alternative, however, it is also possible to use an "old" table from a previous application of the method. In a preferred exemplary embodiment, the correction values of the table are re-determined in each case after the control and evaluation unit 32 is switched on.

The method according to FIG. 4 is suitable for filling the correction value table because it is not possible to predict the head position which is produced in a sensing cycle or the table cell which is produced after the modulo operation. Using the high sampling rates and measurement speeds of modern coordinate measuring machines, the correction value table is filled very quickly. Remaining "holes" can be filled by inserting interpolated table values in accordance with step 72.

In accordance with a particularly preferred embodiment, an "update table" 40 is continuously regenerated in the measuring mode of the coordinate measuring machine 10. The update table is then transferred at defined time intervals into the memory 38 (step 76), where it is used for correcting the position data. Following the transfer of the update table into the memory 38, a new update table is created in accordance with the method in FIG. 4.

Figure 5:
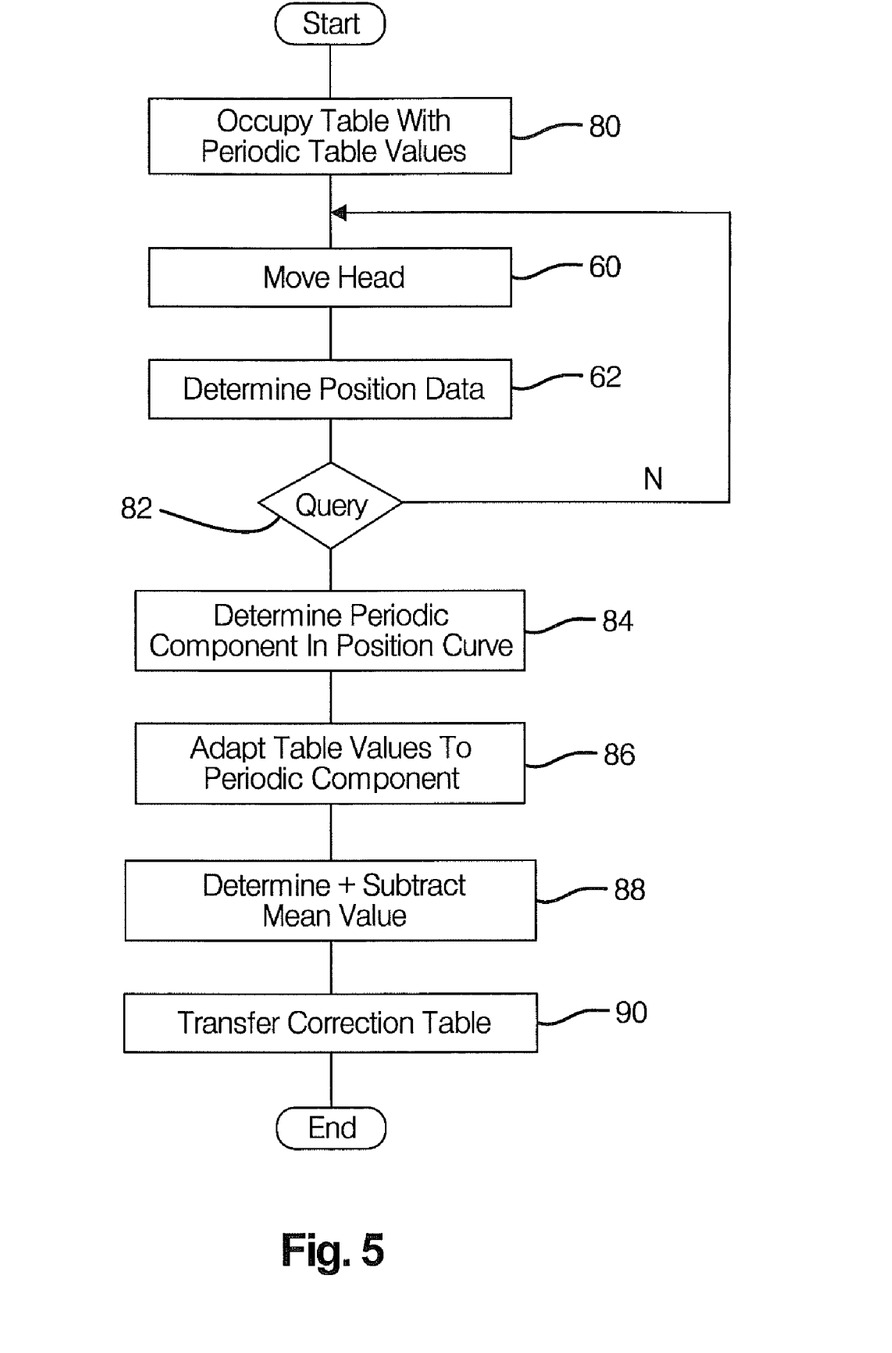
FIG. 5 shows a simplified flow diagram for explaining a second exemplary embodiment of the novel method.

FIG. 5 shows a further exemplary embodiment of the novel method. In this case, a correction value table is initially occupied by "periodic" table values (step 80), i.e. by table values which represent a period of a periodic curve. For example, a sinusoidal curve can be used here.

The head 28 is then moved along a path of travel in accordance with the steps 60, 62 and the position data of the head 28 is read in. The movement of the head continues until the planned path of travel has been covered (step 82).

In step 84, the recorded position curve is analyzed and a periodic component is sought whose period corresponds approximately to the periodic division of the associated scale. The periodic component can be determined e.g. by means of a filter or also by means of a fast Fourier transformation (FFT).

According to step 86, the initially assumed table values are then adapted to the periodic component. The adaptation takes place according to the least squares method, for example. The objective of the whole is to adapt the phase position, the amplitude and the offset of the "periodic" table values to the actual periodic component.

As soon as this adaptation is complete, the mean value of all table values is again determined and subtracted from all table values in accordance with step 88. Finally, the transfer of the correction value table for the correction of interpolated position data can take place in accordance with step 90.

What is claimed is:

1. In a machine having a mobile head and a position measurement device for determining movement positions of the head, wherein the position measurement device includes a material measure with a periodic division, and wherein interpolation values which further subdivide the periodic division are used for determining the movement positions, a method performed by the machine for correcting the interpolation values comprising the steps of:
    moving the head to a plurality of positions,
    determining a plurality of position data corresponding to the positions of the head by the position measurement device, wherein the plurality of position data represents a position curve,
    determining a periodic component in the position curve, said periodic component having a period which corresponds approximately to the periodic division of the material measure, and
    determining correction values and correcting the interpolation values using the correction values such that the amplitude of the periodic component is substantially reduced.

2. The method of claim 1, wherein the position curve is filtered in order to determine the periodic component.

3. The method of claim 1, wherein a drag signal is generated when the head moves, said drag signal representing a difference between a set position and an actual position of the head, and wherein the periodic component is determined on the basis of the drag signal.

4. The method of claim 1, wherein the correction values are stored in a sequential correction value table, with each interpolation value being assigned exactly one table cell in the sequential correction value table.

5. The method of claim 4, wherein each interpolation value is assigned in said one table cell which is derived from the position data of the head using a modulo N operation, with N being the number of correction values in the sequential correction value table.

6. The method of claim 4, wherein the correction values of the correction value table are iteratively determined.

7. The method of claim 4, wherein the correction values of the correction value table are determined in random chronological sequence until a defined number of correction values has been determined.

8. The method of claim 4, wherein two correction value tables are provided, with a first correction value table being used for determining the correction values while a second correction value table is used for correcting the interpolation values, and wherein the correction values from the first correction value table are transferred into the table cells of the second correction value table.

9. The method of claim 1, wherein the correction values are determined on the basis of a predefined periodic correction value curve which is adapted to the periodic component with respect to phase, amplitude and offset.

10. A machine including:
    a mobile head,
    a position measurement device for determining movement positions of the head, the position measurement device having a material measure with a periodic division,
    a processor for determining interpolation values which further subdivide the periodic division, and
    a unit for determining correction values for correcting the interpolation values, wherein the unit is designed for recording a position curve having a plurality of position data which corresponds to the changing positions of the head, wherein the unit is further designed for determining a periodic component in the position curve, the periodic component having a period which corresponds approximately to the periodic division of the material measure, and wherein the unit is further designed for determining the correction values and correcting the interpolation values using the correction values such that the amplitude of the periodic component is substantially reduced.

11. A non-transitory data storage medium where program code is stored, which program code is designed for running on a control computer of a machine having a mobile head, a position measurement device for determining movement positions of the head, the position measurement device having a material measure with a periodic division, and having a processor for determining interpolation values which further subdivide the periodic division, wherein the program code is designed to execute a method comprising the steps of:
    moving the head to a plurality of positions,
    determining a plurality of position data corresponding to the positions of the head by the position measurement device, wherein the plurality of position data represents a position curve,
    determining a periodic component in the position curve, said periodic component having a period which corresponds approximately to the periodic division of the material measure, and
    determining correction values and correcting the interpolation values using the correction values such that the amplitude of the periodic component is substantially reduced.

12. In a machine having a mobile head and a position measurement device for determining movement positions of the head, wherein the position measurement device includes a material measure with a periodic division, and wherein interpolation values which further subdivide the periodic division are used for determining the movement positions, a method performed by the machine for correcting the interpolation values comprising the steps of:
    moving the head to a plurality of positions,
    determining a plurality of position data corresponding to the positions of the head by the position measurement device, wherein the plurality of position data represents a position curve,
    determining a periodic component in the position curve, said periodic component having a period which corresponds approximately to the periodic division of the material measure, and determining correction values and correcting the interpolation values using the correction values such that the amplitude of the periodic component is substantially reduced, wherein a drag signal is generated when the head moves, said drag signal representing a difference between a set position and an actual position of the head, and wherein the periodic component is determined on the basis of the drag signal.

* * * * *